(12) United States Patent
Ling et al.

(10) Patent No.: US 11,918,950 B2
(45) Date of Patent: Mar. 5, 2024

(54) DEEP-CONDENSATION VOCS RECOVERY SYSTEM USING AIR AS REFRIGERANT

(71) Applicant: NANJING TECH UNIVERSITY, Jiangsu (CN)

(72) Inventors: Xiang Ling, Jiangsu (CN); Dongren Liu, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 810 days.

(21) Appl. No.: 16/977,718

(22) PCT Filed: Sep. 30, 2018

(86) PCT No.: PCT/CN2018/108919
§ 371 (c)(1),
(2) Date: Nov. 10, 2020

(87) PCT Pub. No.: WO2019/165782
PCT Pub. Date: Sep. 6, 2019

(65) Prior Publication Data
US 2021/0260518 A1    Aug. 26, 2021

(30) Foreign Application Priority Data
Mar. 2, 2018 (CN) .......................... 201810174546.7

(51) Int. Cl.
B01D 53/00 (2006.01)
B01D 53/26 (2006.01)

(52) U.S. Cl.
CPC ......... *B01D 53/002* (2013.01); *B01D 53/265* (2013.01); *B01D 2257/708* (2013.01); *B01D 2258/06* (2013.01)

(58) Field of Classification Search
CPC ...... F25J 1/0262; F25J 1/0271; F25J 3/04945; F25J 5/00; F25J 2220/42; F25J 2220/50; F25J 2220/82; B01D 5/00; B01D 2258/06; B01D 2257/708; B01D 53/265; B01D 53/002
See application file for complete search history.

(56) References Cited

FOREIGN PATENT DOCUMENTS

| CN | 102441290 A | 5/2012 |
|---|---|---|
| CN | 104606915 A | 5/2015 |
| CN | 104857735 A | 8/2015 |
| CN | 204767539 U | 11/2015 |
| CN | 206082049 U | 4/2017 |
| CN | 106731481 A | 5/2017 |
| CN | 106871140 A | 6/2017 |
| CN | 106902617 A | 6/2017 |
| CN | 106943839 A | 7/2017 |
| CN | 107158945 A | 9/2017 |

(Continued)

*Primary Examiner* — Miguel A Diaz
(74) *Attorney, Agent, or Firm* — NKL Law; Allen Xue

(57) ABSTRACT

A high-efficiency low-cost deep-condensation VOCs recovery system uses air as refrigerant. The recovery system includes a gaseous air purification system, an air liquefaction system and a VOCs recovery cold box. The gaseous air purification system includes an air filter, a cold dryer and an air purifier; the air liquefaction system comprises an air compressor, an air storage tank, a turbo-expander and an air precooler. The VOCs recovery cold box includes a VOCs precooler, a VOCs condenser and a gas-liquid separator.

8 Claims, 3 Drawing Sheets

(56) References Cited

FOREIGN PATENT DOCUMENTS

| | | | |
|---|---|---|---|
| CN | 107202333 | A | 9/2017 |
| CN | 206582866 | U | 10/2017 |
| CN | 108452632 | A | 8/2018 |
| CN | 109224755 | A * | 1/2019 |
| JP | 2016107194 | A | 6/2016 |
| KR | 20130000222 | A | 1/2013 |

* cited by examiner

DEEP-CONDENSATION VOCS RECOVERY SYSTEM USING AIR AS REFRIGERANT

TECHNICAL FIELD

The invention belongs to the field of purification and separation of volatile organic gases, and particularly relates to a system and a method for separating and recovering volatile organic gases with high efficiency and low cost.

BACKGROUND ART

VOCs, short for volatile organic compounds, are a major cause of smog and PM2.5. In order to reduce the harm of heavy pollution weather to people's life, various VOCs coping mechanisms have been put forward in China. The most important point is to reduce the emission of VOCs in industrial production and strengthen the recovery and treatment of VOCs.

At present, VOCs recovery technologies used in China mainly comprise condensation, adsorption, absorption, catalytic combustion and membrane separation. As disclosed in the recently published patent CN 201710160578.7, an apparatus and a method for purifying and recovering high-concentration VOC gas, CN 201710594939.9, a purification system and a purification method for removing VOC in industrial waste gas, CN 201710061520.7, a method and a device for treating VOC waste gas by cyclone adsorption with activated carbon, and the like are all patents on recovering VOCs by an adsorption method. Although the principle of these methods is simple, but the recovery effect is limited, most of these are difficult to meet the emission standards. In order to reduce the recovery cost, many methods such as biological decomposition, plasma decomposition, photocatalyst decomposition and so on have appeared in recent years, but the technology is not mature, the treatment period is long, the primary recovery effect is mostly not ideal, so it is necessary to cooperate with other means for secondary treatment of VOCs gas, which has not been put into use on a large scale. As disclosed in CN 201710268178.8, a VOC condensation catalytic combustion treatment device is a combination of condensation and catalytic combustion, CN 201720265460.6, a novel VOC treatment device is a combination of photocatalytic decomposition and catalytic combustion, in CN 201710157457.7, purification apparatus capable of selectively performing bio-catalytic combustion on VOC waste gas, and use method thereof is a method of bio-decomposition followed by combustion, and CN 201710451220.X, a harmless treatment method for sulfur-containing VOC is to burn firstly and then introduce the burnt tail gas into alkali liquor for absorption. Although these methods have certain innovation, there are still some problems in practical application, such as complex process, high energy consumption and so on.

In recent years, the emission standard of VOCs in China has been improved continuously. The VOCs emission standard cannot be achieved only by the simple combination of traditional adsorption, condensation or other methods. If the condensation temperature is reduced or the adsorption times are increased simply in order to improve the recovery rate, the recovery cost is increased greatly. The invention aims to overcome the defects and problems of the technology, meet the requirement of industrial large-scale continuous production and improve the recovery efficiency while reducing the recovery cost. Compared with the above-mentioned invention patent, the invention has great difference in principle, process, device and operation method, and especially has great difference in comparison with an efficient and low-cost VOC recovery system and method in CN 201510068202.4 which was previously applied by the applicant and has been granted for patent. The applicant's earlier granted invention patent (CN 201510068202.4, an efficient and low-cost VOC recovery system and method) uses liquid nitrogen as a heat exchange medium without involving a gas purification system and a liquefaction system. Meanwhile, liquid nitrogen and VOCs gas are subjected to heat exchange in a direct contact mode, so that the VOCs are deeply condensed to achieve the purpose of separation. In addition, the microchannel heat exchangers used in the patent (CN 201510068202.4, an efficient and low-cost VOC recovery system and method) are all plate-type modular installations. However, the heat exchanger used in this patent is a spiral microchannel surface heat exchange.

SUMMARY OF THE INVENTION

The invention discloses a deep-condensation VOCs recover system using air as refrigerant, which is a method for deeply condensing VOCs by utilizing air and finally separating and recovering. The principle is that the purified air is firstly compressed and then expanded to become liquid air, and then the liquid air and the VOCs gas are subjected to heat exchange, so that the VOCs gas is cooled to $-130°$ C. to $-140°$ C., and the non-methane total hydrocarbon content is reduced to 70 to 120 $mg/m^3$. The treated VOCs gas completely meets the national emission standard and can be directly discharged into the atmosphere. Compared with the traditional condensation method, the method has the advantages that the recovery process can be effectively shortened, the recovery process is simplified, and the standard emission of the VOCs gas is well realized. The apparatus is compact in size, more flexible and convenient to install, is not limited by the concentration of source gas, and has a wider application range.

In order to achieve the above purpose, the invention provides the following technical scheme:

A deep-condensation VOCs recover system using air as refrigerant, comprises a gaseous air purification system, an air liquefaction system and a VOCs recovery cold box. The gaseous air purification system comprises an air filter, a cold dryer, an air purifier, a pipeline valve, a measuring instrument and the like. The air filter is filled with adsorbents such as molecular sieves, zeolites and the like for preliminarily removing microparticles and impurities in the air, the cold dryer is used for removing moisture contained in the air, the purifier is used for further purifying the gas and removing a small amount of sulfur dioxide, hydrogen sulfide and partial nitrogen oxides contained in the air. The air liquefaction system mainly comprises a primary compressor, a turbo-expander, an air microchannel precooler, a gas bearing, a pipeline, a valve, a temperature measuring apparatus, a frequency converter and other auxiliary devices. The air compressor is mainly used for primary compression of air, the microchannel precooler is used for cooling high-temperature air at the outlet of the compressor, and the turbo-expander is mainly used for further compressing and expanding the pre-compressed air to liquefy the air. The temperature measuring apparatus is used for measuring the temperature of the gas, and the pipeline and the valve are used for conveying the gas. The VOCs recovery cold box mainly comprises a VOCs microchannel precooler, a VOCs spiral microchannel condenser, a gas-liquid separator, a liquid level meter and the like, and the air precooler is arranged in the VOCs recovery cold box. The recovery cold box is an important device for recovering VOCs, and the cold box is insulated by vacuum powder to ensure the ultra-low temperature environment in the cold box. The VOCs fin plate precooler is used for removing part of water vapor in VOCs gas, preventing the gas from freezing after entering the VOCs microchannel condenser and blocking channels. The VOCs spiral microchannel condenser is mainly used for condensing and recovering VOCs gas, and meanwhile device damage caused by thermal stress can be prevented. The gas-liquid separator is mainly used for separating the condensed VOCs liquid, conveying the liquid to a storage tank for storage, and returning the gas to the VOCs microchannel precooler for heat exchange with the normal-temperature VOCs gas.

Furthermore, the fin plate VOCs precooler is of a three-stream partition wall type structure, two streams are VOCs channels, and one stream is a liquefied air channel. Wherein, the two streams of the VOCs channel work alternately. When one stream of VOCs is pre-cooled, hot air is introduced into the VOCs channel of the other stream for purging, so that the purpose of deicing is achieved, and the channel is prevented from being blocked. After the purging of one VOCs channel is finished, purging the other VOCs channel, and the channel which has finished purging continues to be filled with VOCs gas for condensation. This alternation ensures continuous production.

Further, the VOCs inlet and outlet of the fin plate VOCs precooler are symmetrically positioned on the left side and the right side of the precooler, and the liquefied air inlet and outlet are symmetrically distributed at the upper end and the lower end of the precooler.

Further, the VOCs gas in the fin plate VOCs precooler flows in cross flow with the liquefied air. Compared with the prior invention and technology, the invention has the following beneficial effects:

1. The operation cost of the system can be greatly reduced by using the air without cost as a condensation medium.
2. The VOCs gas can be cooled to −130° C. to −140° C. effectively by using the ultra-low temperature of the liquefied air to realize the deep condensation of the VOCs gas, and the treated VOCs gas can well meet the emission standard. This cannot be achieved only by conventional condensation methods.
3. The use of the method is not limited by the concentration, the component and the flow rate of the source gas, and the application range is wider. This also breaks the technical bottleneck that the conventional condensation method is only suitable for high-concentration VOCs gas.
4. The device does not need a plurality of high-power compressors to work simultaneously, so that the construction cost is greatly reduced. Meanwhile, the recycling process is shortened, and the running stability of the device is improved.

DETAILED DESCRIPTION OF THE INVENTION

Example 1

The present invention will now be described in detail with reference to the drawings and specific embodiments. Obviously, the embodiments described are only a few, but not all, embodiments of the present invention. Based on the embodiments of the present invention, all other embodiments obtained by a person of ordinary skill in the art without involving any inventive effort are within the scope of the present invention.

Figure 1:
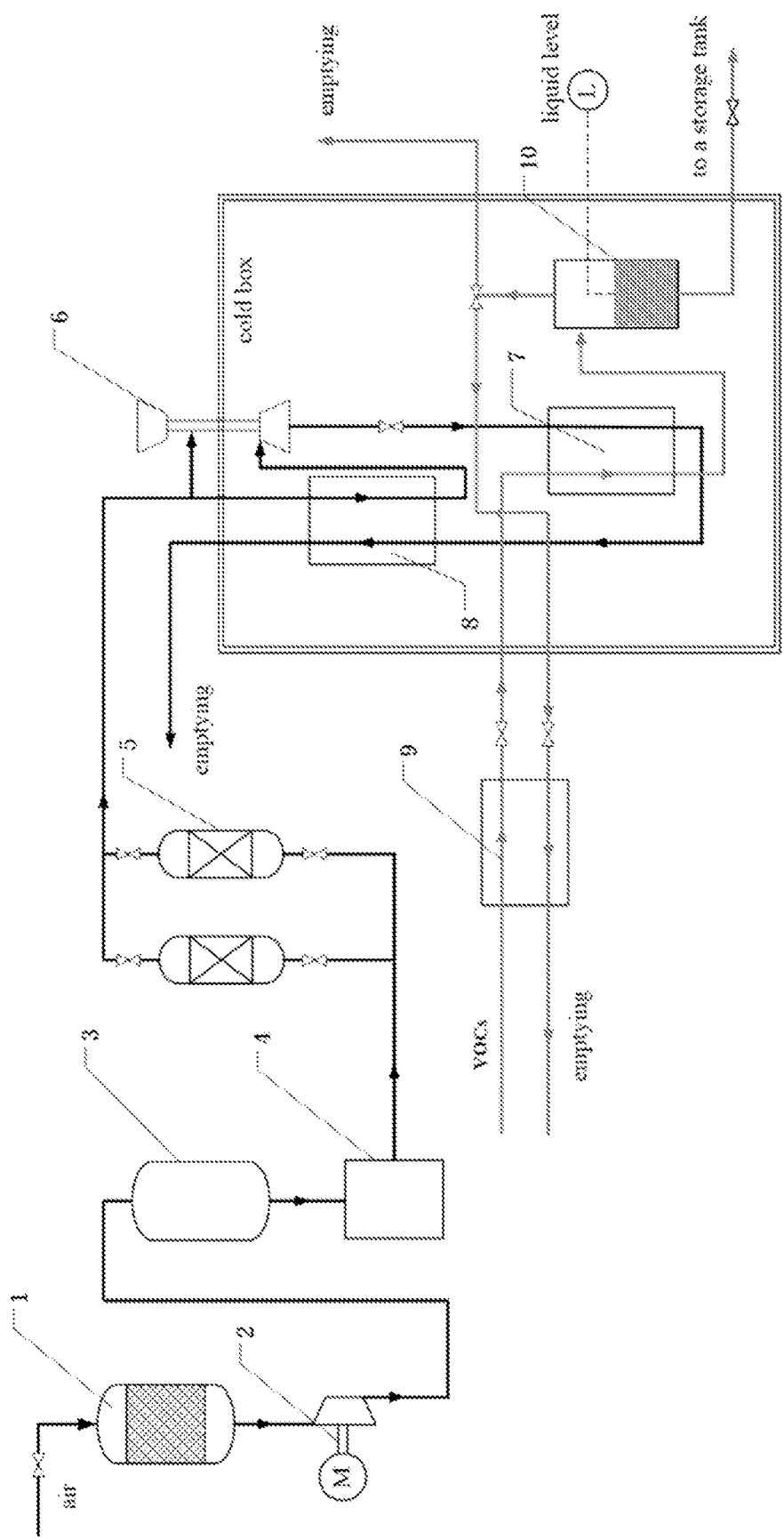
FIG. 1 is a flow chart of embodiment 1 of the present invention.

As shown in FIG. 1, a VOCs recover system, comprises a gaseous air purification system, an air liquefaction system and a VOCs recovery cold box. The gaseous air purification system comprises an air filter 1, a cold dryer 4 and an air purifier 5; the air liquefaction system comprises an air compressor 2, an air storage tank 3, a turbo-expander 6 and an air precooler 8; the VOCs recovery cold box comprises a VOCs condenser 7, a VOCs precooler 9 and a gas-liquid separator 10.

When the system works, air at normal temperature and normal pressure enters the air filter 1 through a pipeline for primary filtration, and most dust and particles in the air are removed. The preliminarily purified air flows out from the outlet of the air filter 1 and enters the air compressor 2 to be preliminarily compressed, and the compressed air is conveyed to the air storage tank 3 to be buffered and stored. The outlet of the air storage tank 3 is connected with the cold dryer 4, compressed air with certain pressure and temperature enters the cold dryer 4 from the outlet of the air storage tank 3, moisture contained in the compressed air is removed, water vapor in the air is prevented from freezing in a subsequent process to cause channel blockage, and to affect the operation of the system. And the dried compressed air continues to enter the air purifier 5 along the pipeline to remove part of impurity gases such as hydrogen sulfide, sulfur dioxide and the like contained in the air and finish the final purification process. One part of the purified air enters an air bearing of the turbo-expander 6, the other part of the purified air enters the air precooler 8 for precooling, and the precooled high-pressure air enters the turbo-expander 6 to expand to be liquefied air. The liquefied air enters the VOCs condenser 7 and exchanges heat with the precooled VOCs gas to liquefy the VOCs gas. The temperature of the heat-exchanged air is still low, and if the heat-exchanged air directly enters the atmosphere, the cooling capacity is wasted. Therefore, the low-temperature air is introduced into the cold fluid channel of the air precooler 8, exchanges heat with the high-temperature and high-pressure air flowing out from the air purifier 5, precools the high-temperature and high-pressure air, and realizes the cascade utilization of the cooling capacity in the liquefied air. The heat-exchanged air can be directly discharged into the atmosphere or returned to the compressor to be compressed and liquefied again and recycled.

VOCs gas from the production link enters the VOCs precooler 9 firstly, is precooled to about 3° C. to 4° C. in the VOCs precooler 9, and water vapor contained is removed. The dried VOCs gas enters the VOCs condenser 7 along a pipeline and exchanges heat with liquefied air from the turbo-expander 6. In the VOCs condenser 7, the VOCs are cooled to −130° C. to −140° C. by liquefied air, after the non-methane total hydrocarbon content in the VOCs condenser 7 is reduced to 70-120 mg/m$^3$, enters a gas-liquid separator 10, and the VOCs condensate is separated and conveyed to a storage tank for storage. And the purified low-temperature tail gas enters the precooler through the cold fluid inlet of the VOCs precooler 9 due to low temperature, performs primary heat exchange with the VOCs with high temperature, and then discharges into the atmosphere through the outlet of the VOCs precooler 9.

Figure 2:
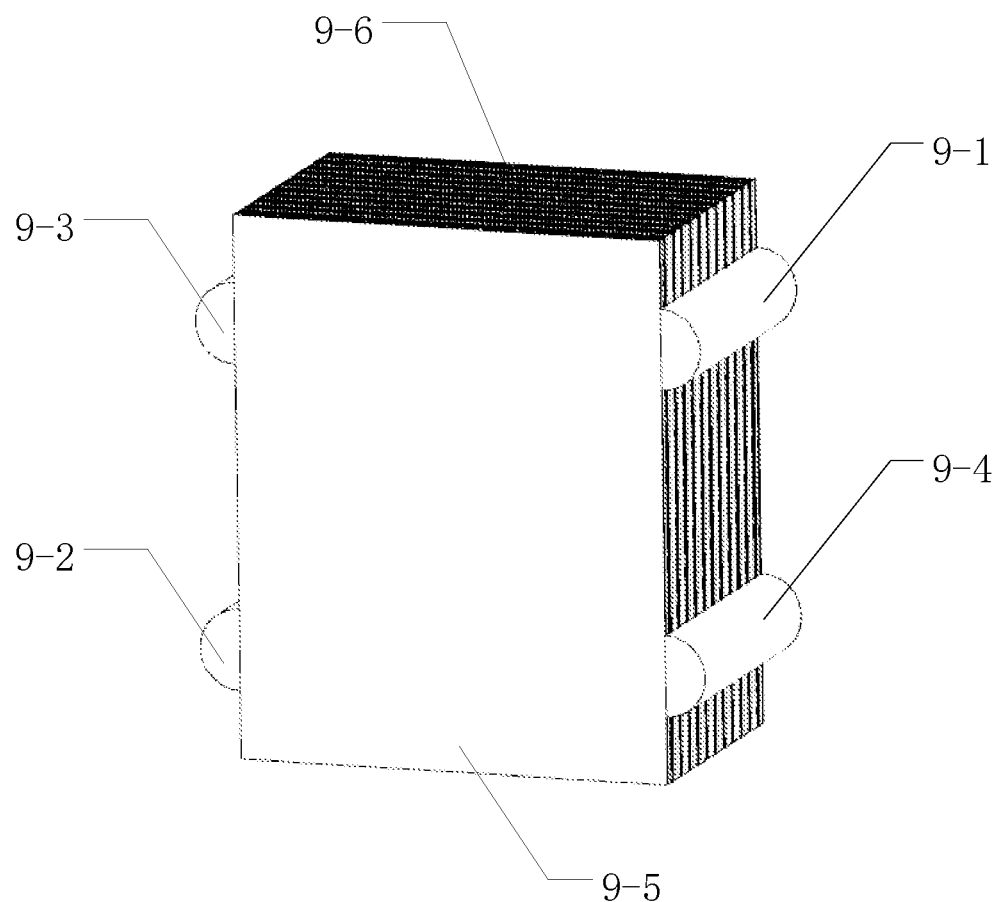
FIG. 2 is a schematic view showing the structure of the fin plate precooler of the present invention.

FIG. 2 is a schematic view showing the structure of the fin plate type VOCs precooler 9. The three-stream fin plate precooler, wherein the liquefied air channel is a microchannel with the diameter smaller than 1 mm, and the VOCs channel is a wide-size channel. 9-1 and 9-3 are VOCs gas inlets, 9-2 and 9-4 are VOCs outlets, 9-5 are purified air inlets, and 9-6 are air outlets. During operation, VOCs gas and low-temperature purified air enter the precooler from 9-1 and 9-5 respectively, after heat exchange is completed in the precooler, the air flows out from an outlet 9-6 above the precooler and enters the next process, and a VOCs gas-liquid mixture after water vapor removal flows out from an outlet 9-2 at the other end. After a period of operation, the channels between 9-1 and 9-2 need to be purged with hot air to prevent water vapor from freezing and blocking the precooler channels. At this time, the VOCs gas is introduced into the precooler from 9-3, and flows out from the outlet 9-4 after heat exchange. Therefore, switching is carried out, the two channels work alternately, and continuous production is guaranteed.

Example 2

Figure 3:
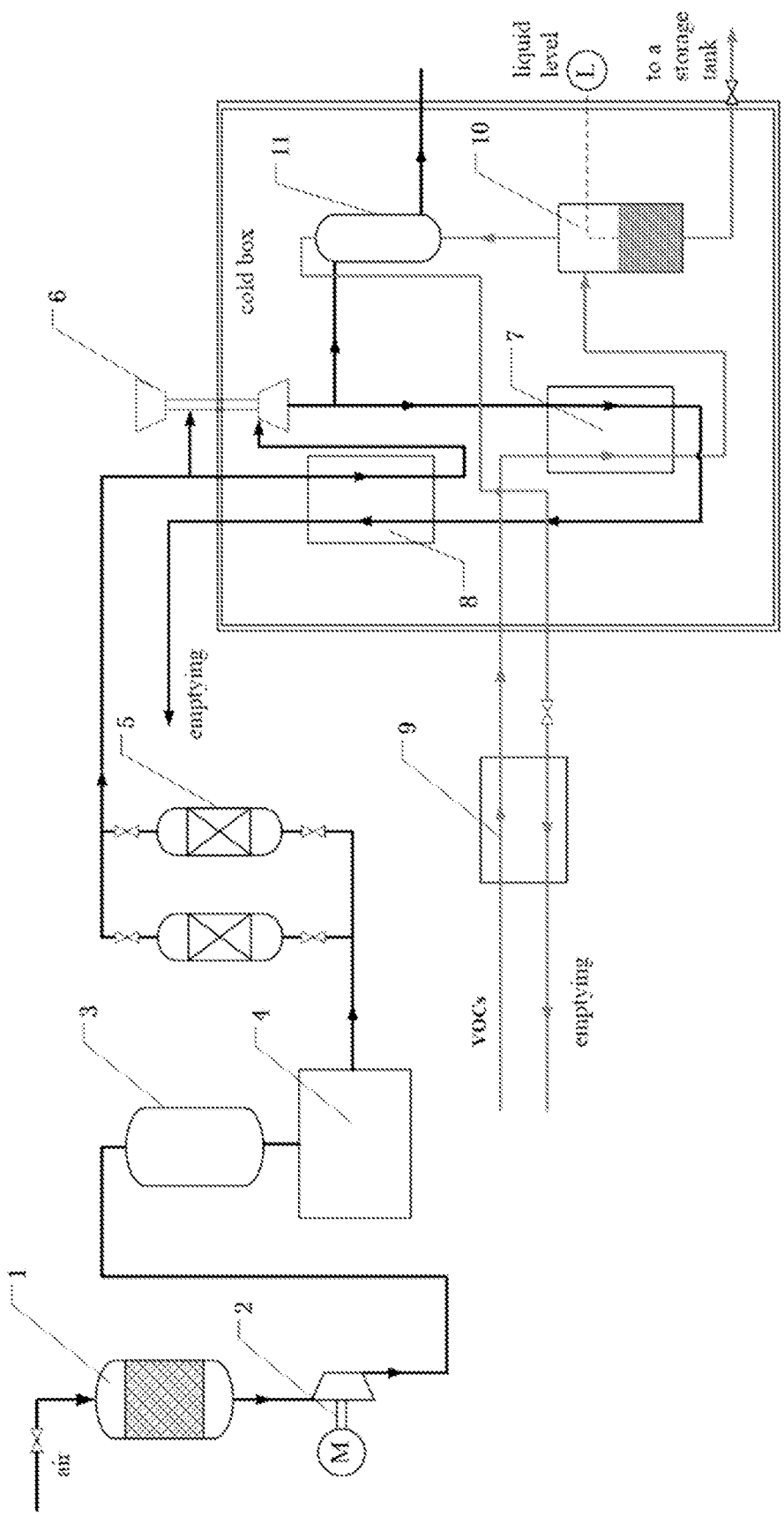
FIG. 3 is a flow chart of embodiment 2 of the present invention.

In addition to the process adopted in embodiment 1, the gas separated by the gas-liquid separator can be further treated to reduce the VOCs content therein. As shown in FIG. 3, gas flowing out of the gas-liquid separator 10 enters the microchannel mixer 11 to be directly mixed with liquid air, separated liquid components enter a storage tank to be stored, and low-temperature gas enters the next process. In the present embodiment, the VOCs precooler and the air precooler may be identical or different in structure, but perform different functions. The other devices are the same as those in Embodiment 1 and will not be described in detail.

The invention claimed is:

1. A deep-condensation Volatile Organic Compounds (VOCs) recovery system using air as refrigerant, comprising a gaseous air purification system, an air liquefaction system, and a VOCs recovery cold box,
wherein the gaseous air purification system comprises an air filter, a cold dryer and an air purifier, and the air liquefaction system comprises an air compressor, an air storage tank, a turbo-expander and an air precooler, an outlet of the air filter being connected with an inlet of the air compressor, an outlet of the air compressor being connected with an inlet of the air storage tank,
wherein the VOCs recovery cold box comprises a VOCs precooler, a VOCs condenser, a gas-liquid separator, the air precooler, and the turbo-expander, and the interlayer of a shell of the VOCs recovery cold box is filled with a powder and vacuumized to achieve the purpose of heat insulation,
wherein a liquefied air serves as a cooling medium to condense VOCs in a VOCs gas, and during operation, air passes through the air filter to remove microparticles and impurities contained in the air, and
the filtered air is compressed by the air compressor and enters the air storage tank for storage.

2. The VOCs recovery system of claim 1, wherein the outlet of the air storage tank is connected with an inlet of the cold dryer, an outlet of the cold dryer is connected with an inlet of the air purifier, and an outlet of the air purifier is connected with a hot air inlet of the air precooler in the VOCs recovery cold box.

3. The VOCs recovery system of claim 2, wherein a hot air outlet of the air precooler is connected with an inlet of the turbo-expander, an outlet of the turbo-expander is connected with an air inlet of the VOCs condenser, and a air outlet of the VOCs condenser is connected with an cold air inlet of the air precooler, wherein the turbo-expander liquefies air from the air precooler and the liquified air enters the VOCs condenser for heat exchange with the VOCs gas prior to entering the air precooler for heat exchange with hot air from the air purifier.

4. The VOCs recovery system of claim 1, wherein an outlet of the VOCs precooler is connected with an inlet of the VOCs condenser in the VOCs recovery cold box, and an outlet of the VOCs condenser is connected with an inlet of the gas-liquid separator, and
wherein the VOCs gas passes through the VOCs precooler to remove moisture in the VOCs gas and to form a dried VOCs gas, the dried VOCs gas enters the VOCs condenser in the VOCs recovery cold box and exchanges heat with the liquified air and the VOCs gas is condensed into a liquid state to form a gas-liquid mixture, which enters the gas-liquid separator to separate liquid from gas in the gas-liquid mixture.

5. The VOCs recovery system of claim 4, wherein a gas outlet of the gas-liquid separator is connected with an inlet of the VOCs precooler; and a tail gas exiting the VOCs recovery cold box is subjected to heat exchange with the VOCs gas.

6. The VOCs recovery system of claim 4, wherein the VOCs precooler is a fin plate partition-wall precooler having three channels, wherein a first channel and a second channel serve as passages for the VOCs gas and a third channel serves as a passage for the liquefied air, the third channel is a microchannel with a diameter smaller than 1 mm, the first and the second channels are wide-size channels.

7. The VOCs recovery system of claim 6, wherein the VOCs gas in the VOCs precooler flows in a cross flow pattern relative to the liquefied air.

8. The VOCs recovery system of claim 2, wherein the VOCs recovery system comprises a microchannel mixer, the gas exiting the gas-liquid separator enters the microchannel mixer to mix with the liquified air.

* * * * *